June 19, 1962  A. C. STARR  3,039,525
AUXILIARY DOOR FOR A BOXCAR
Filed Sept. 15, 1958  3 Sheets-Sheet 1
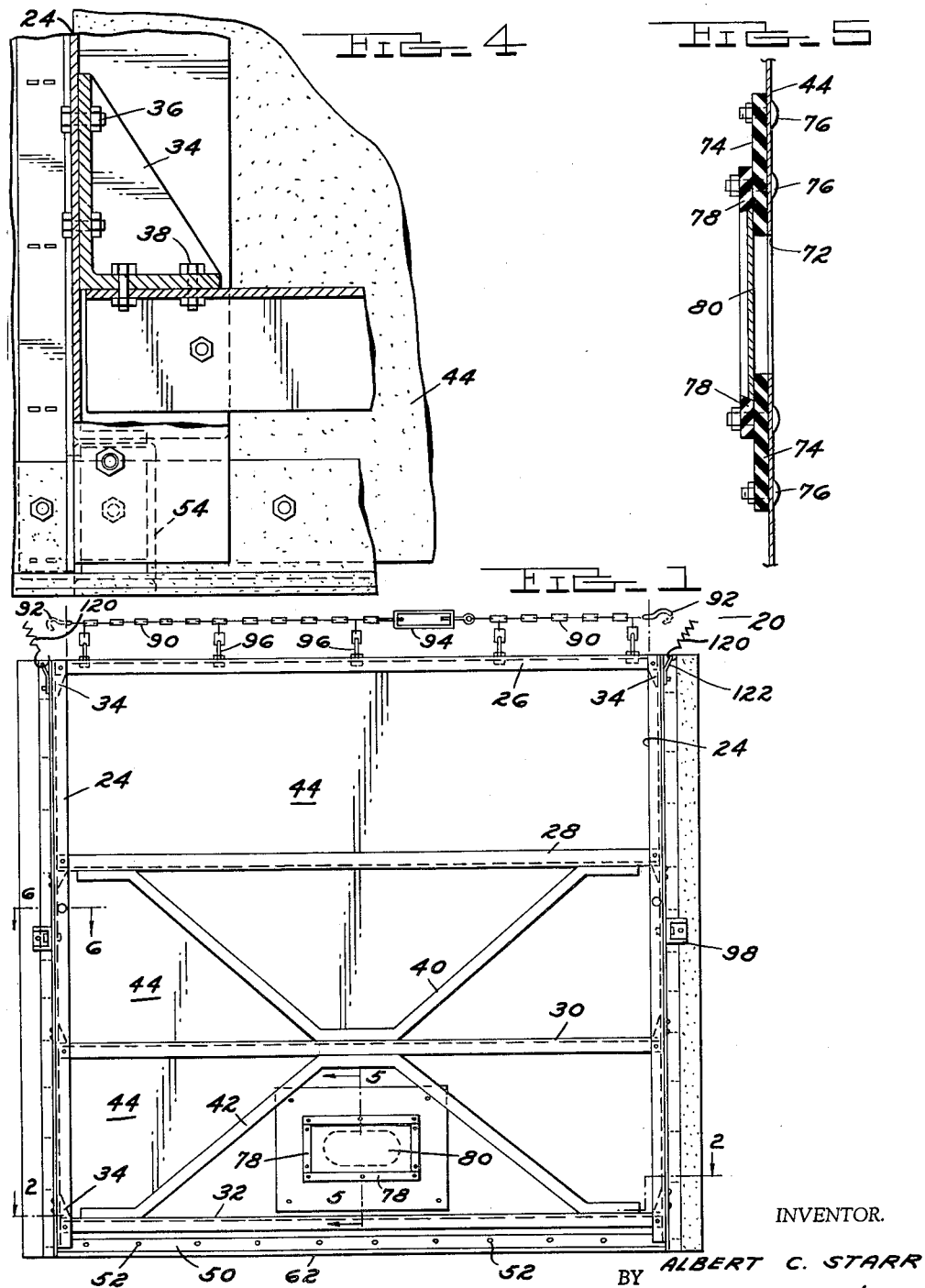
INVENTOR.
ALBERT C. STARR
BY Burton & Parker
ATTORNEYS

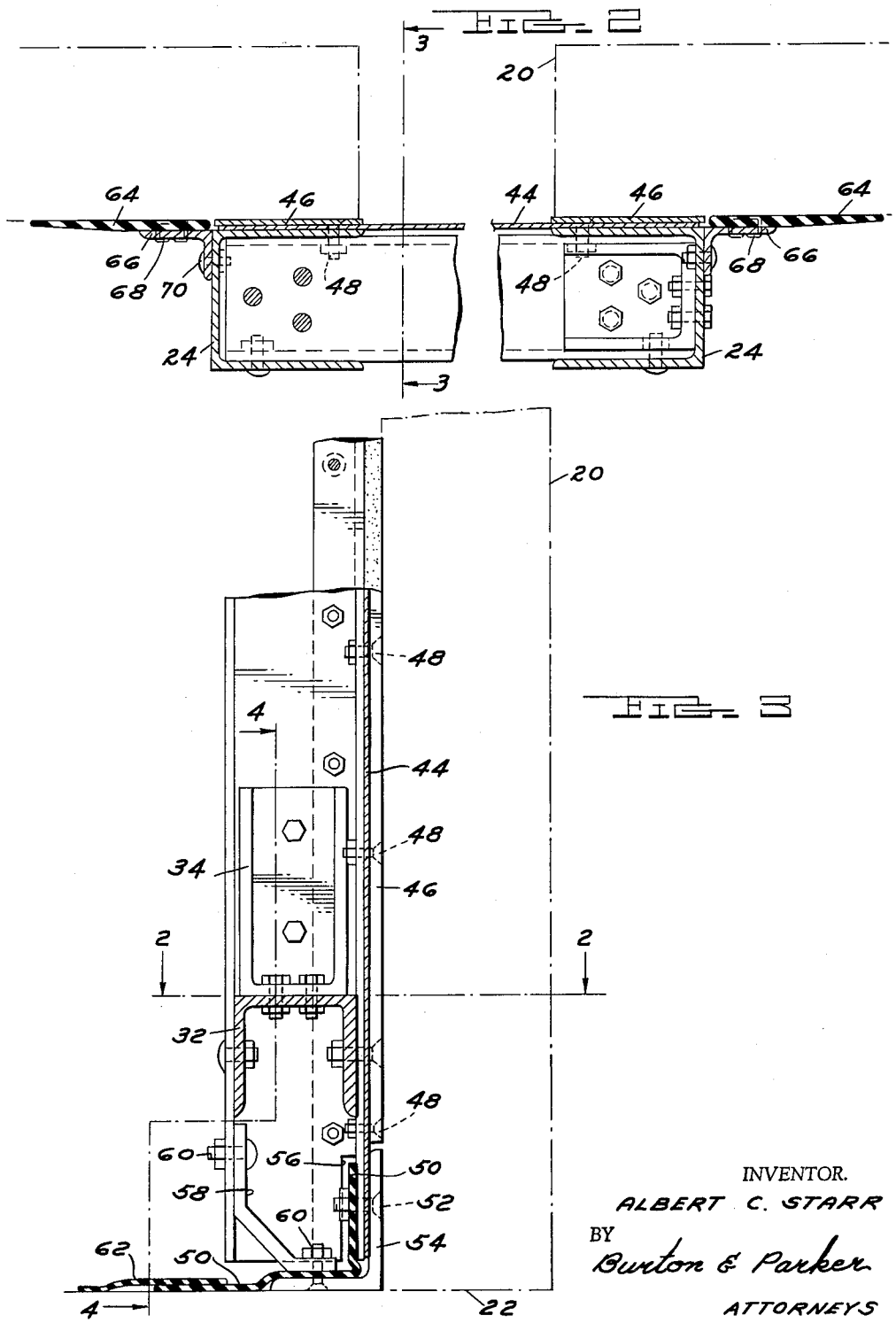

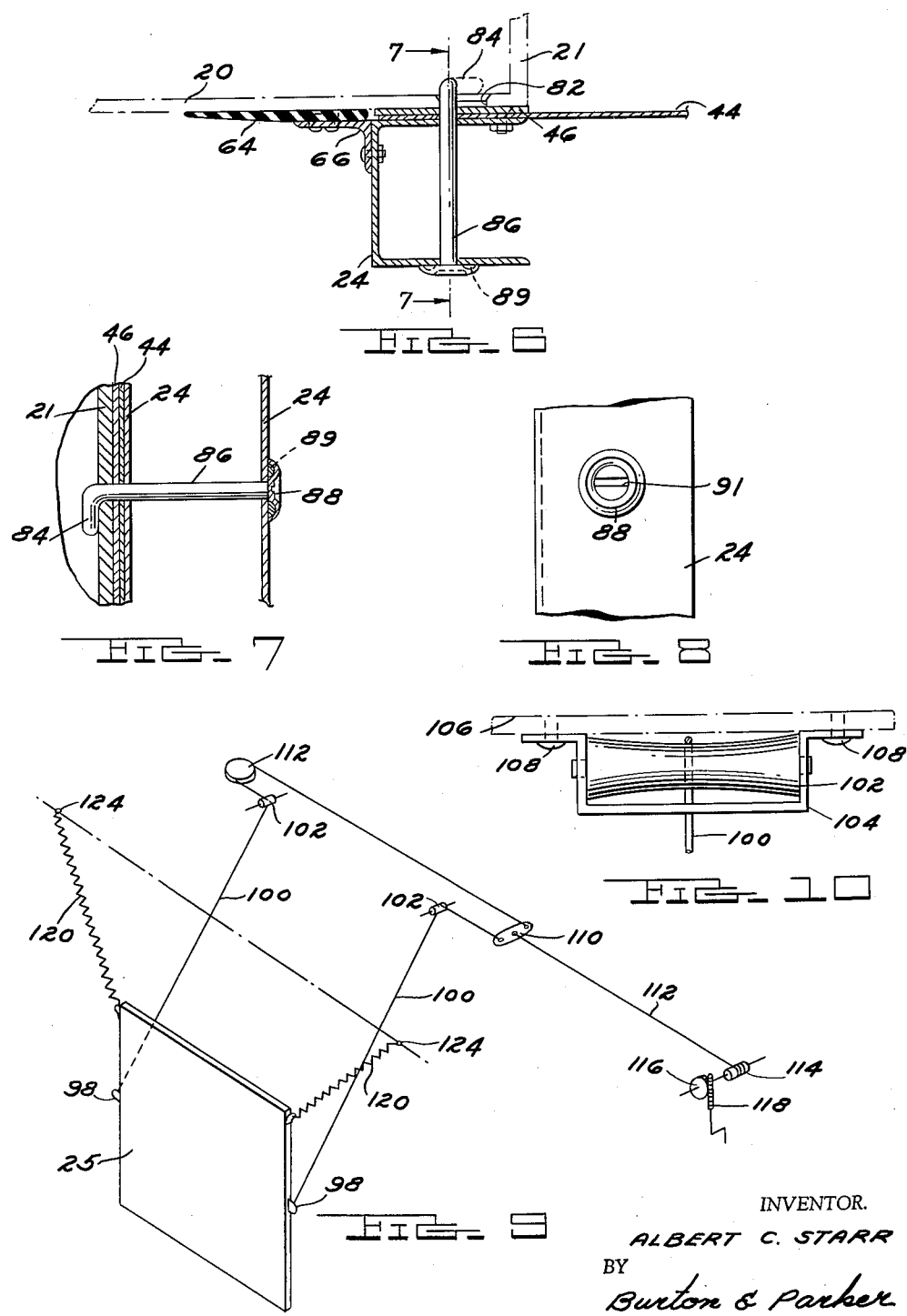

United States Patent Office 3,039,525
Patented June 19, 1962

3,039,525
AUXILIARY DOOR FOR A BOXCAR
Albert C. Starr, 260 N. Main St., Nephi, Utah
Filed Sept. 15, 1958, Ser. No. 760,893
12 Claims. (Cl. 160—40)

This invention relates to an auxiliary door for a boxcar whereby the boxcar is rendered capable of readily serving as a car for the carrying of bulk material such as grain or the like.

An object is the provision of a door which is supplemental to the sliding door provided on the outside of the side wall of a boxcar and which supplemental or auxiliary door is designed to form a tight seal to prevent escape of bulk material comprising small particles such as grain or other suitable material.

Another object is the provision of a door of the character described which is simple, inexpensive and easily installed in place and which provides a tight seal against the adjacent side walls of the car on opposite sides of the door opening and against the floor of the car interiorly of the door opening.

A further object is the provision of an auxiliary door which is adapted when not desired for use to be swung up interiorly of the boxcar and suspended in an out-of-the-way position below the roof of the car and which door is so constructed that it can be easily moved into position or out of position by one person and does not require the employment of tools to secure the same in place or move the same to a stored position interiorly of the car.

Another object of the invention is the provision of a door which is so constructed that the weight of the bulk material loaded within the car serves to assist in maintaining and sealing the door along the floor and along the jamb edges of the door so as to prevent leakage of such material.

A meritorious feature is the provision of a supplemental door having a door frame comprising opposed braced apart jamb elements adapted to be detachably secured to the opposed jamb members of the door opening through the side wall of the car, and which door includes a flexible panel structure extending between the jamb elements and secured thereto outside of the bracing means which braces the jamb elements apart. This flexible door panel is free from the bracing means and is disposed exteriorly of the bracing means whereby pressure of the load thereagainst does not exert an outward pressure against the bracing means which might bend or break the same, but rather exerts a pressure of compression upon and through the jamb elements which pressure of compression is taken by the door frame. Due to the force being a compressive one relatively light jamb elements have proven satisfactory.

A further meritorious feature is the provision of a door of the character described wherein the jamb elements of the door frame are provided with sealing strips extending lengthwise therealong and projecting toward the ends of the car away from the door overlapping the side walls of the car adjacent the jamb members of the door opening. These sealing strips are flexible and formed of suitable sealing material such as plastic, fabric or the like and adapted to form a tight seal against the side walls of the car. A flexible door panel is also provided along its bottom margin with a sealing strip portion extending inwardly of the car overlying the floor thereof and adapted to form a tight seal along the bottom of the door and adapted to be held against the floor by the weight of the load within the car.

Another meritorious feature is the provision of a door of the character described which is adapted to be hoisted to a position underneath the ceiling for storage and which is adapted to be lowered into position to form a closure of the major and lower portion of the door opening and which is self-positioning as it is lowered into place in that yielding tensioning means is associated with it to cause it to assume the proper position with respect to the door opening. Such yielding tension means is in the form of coil springs which extend from the top of the door frame upwardly and laterally to the roof of the box car beyond the ends of the door opening. Such springs yieldingly position the door across the door opening and take most of the weight of the door which floats therefrom.

Another meritorious feature is the provision of a door structure as hereinabove described wherein hoisting mechanism is provided connected with opposite sides of the door frame and operable to swing the door upwardly within the car underneath the roof to support the same suspended therebelow in an out-of-the-way position.

A further meritorious feature is the provision in a door assembly of the character described of a flexible chain detachably secured to extend between the upright jamb members of the door opening in the car spaced above the top of the door and spaced below the top of the door opening, and which chain is detachably connected with the top of the door. Such chain is adapted to carry the weight of loading or unloading chutes and mechanism extended into the car through the door opening above the top of the door. It facilitates ingress and egress from the car by workmen or the like. It protects the light weight door or other mechanism from injury.

Another meritorious feature is the provision within the flexible door panel of an ingress port normally tightly sealed and held sealed by the load within the car but which may be opened from outside the car.

Other objects, advantages, and meritorious features will more fully appear from the following specification, attached claims, and appended drawings, wherein:

FIG. 1 is a front elevation from the inside of the car of a door embodying my invention;

FIG. 2 is a horizontal sectional view partly broken away taken on the line 2—2 of FIG. 3;

FIG. 3 is a vertical sectional view taken on the line 3—3 of FIG. 2;

FIG. 4 is a vertical sectional view taken on the line 4—4 of FIG. 3;

FIG. 5 is a fragmentary vertical sectional view taken on the line 5—5 of FIG. 1;

FIG. 6 is a fragmentary horizontal sectional view taken on the line 6—6 of FIG. 1;

FIG. 7 is a fragmentary sectional view taken on the line 7—7 of FIG. 6;

FIG. 8 is a fragmentary elevation of FIG. 7 and toward the head of the fastening bolt shown therein;

FIG. 9 is a schematic illustration of the hoisting mechanism within the interior of the car connected with the roof thereof and with the door to actuate the same; and, FIG. 10 is an elevation of one of the rollers secured to the ceiling of the car over which the hoist cable extends.

My auxiliary door as heretofore set forth is supplemental to the standard freight car door and is adapted to be extended over the major and lower portion of the door opening within the freight car and to seal such door opening against leakage of material. It is particularly designed for the carrying of grain but obviously any bulk material of small particle size could be similarly carried. It is adapted to be permanently secured within the freight car and to be moved up underneath the ceiling when it is not in use or to be lowered to form a closure for the door opening when in use.

Heretofore it has been common practice to nail boards or other material on the inside of a freight car and over the major and lower portion of the door opening to prevent escape of bulk materials. Many of such materials are sufficiently heavy so that the car is only partially filled therewith. This temporary door structure of whatever material it may be made must be secured in place when the car is put into use to hold such bulk material and is generally thrown away. My door structure is designed to take its place.

In the drawings the line of the side walls of a standard freight car is indicated by the dot and dash line 20 in FIGS. 1, 2 and 3. The outer door with which the car is equipped is not shown and neither is the roof of the car but such are standard. The floor line is indicated by the dot and dash line 22 in FIG. 3. In a standard freight car the door opening may have a height of nine feet and a width of six feet. My supplemental door is not shown as of a height to completely close the door opening but it is adapted to cover the major and lower portion thereof and obviously it might vary as to height desired. It is understood that the door opening is provided normally with upright opposed jamb members extending upwardly from the floor of the car to the roof and there is a header member connecting the jamb members together. The door itself comprises a door frame which includes two opposed upright jamb elements 24 secured together at their upper end by a header element 26. The jamb elements 24 are channel-shaped in cross section as shown in FIG. 2. The header element is channel-shaped in cross section and the channels of these two jamb elements and the header element open inwardly of the door and within the plane of the door and as shown in FIG. 1 they are secured together at their meeting ends with the jamb elements receiving the ends of the header element. The jamb elements are also held in spaced braced apart relationship by a plurality of suitable bracing means.

In the drawings three horizontal braces 28, 30 and 32 are shown extending between the jamb elements 24 and secured thereto at their ends by bolts, rivets or in any other suitable manner. To provide a particularly rigid type of framework angle corner pieces 34 are provided as shown in FIGS. 1 and 4. FIG. 4 shows such an angle corner piece secured by bolts 36 to the jamb element 24 and by bolts 38 to the transverse brace member 32. In addition to the transverse braces 28, 30 and 32, FIG. 1 also shows struts 40 and 42 which extend between the transverse bracing elements and which would be bolted thereto so as to provide a particularly rigid structural frame for the door. To cover the expanse of the door frame there is provided a door panel which is formed of suitable flexible material such as rubber belting, plastic, heavy canvas, flexible sheet metal or the like. This flexible panel is indicated by the numeral 44. Opposite vertical edges of this panel are securely fastened to the jamb elements 24 as shown in FIGS. 1, 2 and 3. Any suitable means for securement may be used but in these figures a facing strip 46 is secured by means of bolts 48 through the panel 44 to the jamb element 24. Such number of bolts 48 as are necessary to form a secure connection may be provided.

This flexible panel which might be formed of heavy rubber such as is used in rubber belting extends down over the outside of the door frame and outside of the bracing elements 28, 30, 32, 40 and 42 and is secured to the frame only at its points of securement with the upright jamb elements 24. It is free from the header 26 and the bracing means specified for a purpose hereinafter more specifically discussed.

To the lower margin of this flexible panel 44 there is secured a flexible sealing strip 50. This sealing strip may be formed of heavy canvas arranged in a plurality of folds or of suitable plastic or the like. It is secured to the lower margin of the flexible panel by bolts 52 or the like or in any other suitable fashion. Preferably it is detachably secured thereto because the sealing strip would probably have to be replaced before the panel itself was replaced.

FIG. 3 shows a metal angular shoe 54 as secured to the lower end of each jamb element 24 and the sealing strip 50 is shown as held by such bolt 52. This sealing strip 50 has a length which is greater than the width of the panel 44 and the ends of the strip extend through cut-outs 56 formed in the lower ends of the upright jamb elements 24, all as shown in FIG. 3. To reinforce the jamb elements 24 at their lower ends an angular brace 58 secured by bolts 60 or the like is shown as connected at one end with the flange of the jamb element and at the opposite end with the shoe 54. It will be noted that in all cases the heads of the bolts are received within cut-outs in the faces of the shoe or face plate 46 or wherever they might come against a surface that was to be sealed.

In addition to the bottom sealing strip 50 which is shown as formed of heavy fabric and provided with a reinforcing marginal strip of heavy rubber 62 there are provided side sealing strips illustrated more clearly in FIG. 2 and indicated as 64. A side sealing strip 64 is provided for each upright jamb element of the door. Such sealing strip is shown here as formed of rubber. Other suitable flexible sealing material might be used. This strip 64 is secured to an angle iron 66 by stitching 68 or the like. This angle iron 66 is attached to the jamb element 24 by bolt 70 or the like. The strip 64 projects beyond the jamb elements substantially within the plane of the door and to overlie the adjacent side wall of the car as shown.

It was stated hereinabove that the bottom sealing strip 50 extended through cut-outs 56 in the jamb elements 24. The ends of this bottom sealing strip are secured to the lower ends of the sealing strips 64 which extend along the side margins of the jamb elements.

The door panel 44 is provided with an access port 72, a margin of which is reinforced on the inside by suitable framing which may be of heavy rubber or the like indicated by the numeral 74, and this framing is secured to the panel by bolt 76 or the like. The framing includes an undercut piece 78 secured thereto and overhanging the same as shown in FIG. 5 wherein a panel 80 which may be formed of plastic, plywood, composition material or any other suitable sheet material is adapted to be received. This panel might be removable and the sections 78 are shown as separate sections in FIG. 1 and removal of the bolts would permit loosening the same. On the other hand the panel might be a frangible one and broken for removal and replaced with another one of a similar character.

The jamb portions of the side wall 20 indicated in FIG. 6 as 21 are provided with horizontal slots 82. A succession of these may be provided. Each one is adapted to receive the inturned end 84 of a bolt 86 which extends through the jamb element 24 as shown particularly in FIGS. 6 and 7. This bolt has a head portion 88 formed as shown in FIG. 8 with a part 91 whereby the bolt may be rotated so as to permit it to be passed through the slot 82 in the jamb member and then turned to lock against the jamb member to hold the door tightly against the jamb member against the door frame in the car. A spring 89 may be disposed underneath the head of the bolt to maintain a tension thereon to pull the door tightly against the jamb members of the boxcar.

A weight supporting element 90 in the form of a chain is shown in FIG. 1 as provided with hooks 92 at its opposite ends, which hooks are adapted to be engaged within apertures formed in the jamb members 21 of the stationary frame about the door opening. In order to tension this chain it is provided with a turnbuckle 94 whereby it may be stretched taut. This chain is adapted to be extended between the door jamb members above the top of the door and below the top of the door opening. A series of eye bolts 96 are attached to the door frame header 26 and provided with links which are engaged over the chain 90 so that the chain is aligned with the top of the door itself by these connector eye bolts and links 96. This flexible chain takes the weight of loading and/or unloading chutes or apparatus extending into the boxcar through the door opening above the top of the door. The chain also protects the door from the weight of workmen entering or leaving the car through the door opening and above the top of the door.

To lift the door as well as to lower it I provide hoisting mechanism shown particularly in FIG. 9. In FIG. 9 the door is indicated by the reference numeral 25. The opposite jamb elements of the door are provided as shown in FIG. 1 with brackets 98 and a cable or flexible connection such as a chain is there attached to each of these two brackets 98 on opposite sides of the door spaced substantially below the top thereof. One flexible cable may extend over a roller 102 carried by a bracket 104 and secured to the roof 106 of the car by bolts or rivets 108 as shown in FIG. 8 to a cross piece 110. The complementary cable 100 which is attached to the other bracket 98 extends over a complementary roller 102 by a shiv 112 mounted on the car ceiling and from there to the opposite end of the cross piece 110. The cross piece 110 is connected by a cable 112 with a roller 114 supported from the car ceiling. This roller is coupled with a gear 116 which is adapted to be actuated by a worm crank 118, all of conventional construction but which constitutes such an assembly that the mechanism retains the position to which it is rotated when the door is elevated up underneath the roof of the freight car.

To center the position of the door properly over the door opening a pair of springs 120 are provided. These springs are attached to opposite upper corners of the door through the use of brackets 122 secured to the jamb elements 24. Opposite ends of the springs are securely connected to the side wall or roof of the car at their junction as indicated at 124. These springs are relatively strong springs and are extended toward the ends of the car over the side walls for a distance of, say, three to four feet beyond opposite ends of the door so that they exert an upward tension on the door and carry in a floating manner the weight of the door and also tend to center the door lengthwise of the car over the door opening. They also serve to hold the top of the door against the inner faces of the jamb members of the door. When the door is elevated the springs 120 extend linearly with the top edge of the lifted door.

In operation it is apparent that the door may be lifted from the position shown in FIG. 9 to one in which it will be suspended below the ceiling, having its bottom end swung upwardly against the ceiling and held thereagainst by the hoisting mechanism. When the door is lifted the hooks 92 at opposite ends of the chain 90 are unfastened and such chain is carried upwardly with the door.

The upper end of the door floats between the tensioned springs 120. The door is therefore suspended below the ceiling well up underneath the ceiling and out of the way. It is apparent also that the door may be lowered by reverse movement of the hoisting mechanism. The door will fall by gravity and the springs 120 will serve to center it as it closes down over the door opening. The attaching bolts 86 are then inserted through the slots in the jamb members and rotated to secure the door thereto.

When the door is secured to the jamb members the sealing strips 64 overlie the jamb members or the adjacent side wall of the car and form a tight seal thereagainst. The sealing strip 50 at the bottom of the door is shown as extending inwardly. It is attached to the door panel. It overlies the floor of the car inwardly of the door.

The weight of the bulk material within the car serves to hold the sealing strip 50 against the floor. It also urges the sealing strips 64 against the side walls of the car. The weight of the load against the panel 44 which is a flexible panel causes such panel to exert a compression force upon the frame of the door tending to urge the jamb elements 24 toward each other. These jamb elements are so braced apart as hereinabove described that they take this compressive force and the flexible panel 44 is held securely thereby and forms a tight seal against the leakage of any bulk load.

What I claim is:

1. An auxiliary door for a boxcar having a side wall door opening provided with opposed upright jamb members, said door comprising a frame having opposed jamb elements connected at their upper ends by a header element and connected together in braced spaced apart relationship below said header by rigid bracing elements whereby said door may be disposed to close the lower portion of the door opening with the jamb elements of the door frame overlying the jamb members of the door opening, means operable to releasably secure the jamb elements of the door to the jamb members of the door opening inside of the boxcar, flexible panel means secured to the jamb members of the door frame on that side of the bracing elements adjacent to the outside of the boxcar, sealing means extending along each jamb element of the door and projecting therebeyond to overlie the adjacent side wall of the boxcar, sealing means extending along the bottom margin of the door panel and inwardly of the floor adjacent thereto, said sealing means adapted to seal the door against the side wall of the car on opposite sides of the door opening and to seal the same against the floor inwardly of the flexible door panel, a linear supporting element extending detachably between and connected at opposite ends to opposite door jamb members spaced above the header of the door, door hangers detachably connecting said linear supporting element in alignment with the header of the door frame.

2. An auxiliary door for a boxcar as defined in claim 1 characterized in that the linear supporting element is a flexible element tensioned lengthwise between the jamb members of the door opening, and characterized further in that spring means are secured to opposite sides of the top of the door and to the interior of the boxcar above the door opening and spaced therefrom toward the opposite ends of the boxcar from the opening exerting upward tension on the door and tending to center the door over the door opening lengthwise of the boxcar.

3. An auxiliary door for a boxcar as defined in claim 1 characterized in that the linear supporting element is a flexible element tensioned lengthwise between the jamb members of the door opening, and characterized further in that spring means are secured to opposite sides of the top of the door and to the interior of the boxcar above the door opening and spaced therefrom toward the opposite ends of the boxcar from the opening exerting upward tension on the door and tending to center the door over the door opening lengthwise of the boxcar, and hoist mechanism is secured to the door jamb elements at points spaced below the top of the door and secured to the interior of the boxcar inwardly of and above the door opening, said hoist mechanism being operable to elevate the door interiorly of the boxcar and to a position spaced above the door opening.

4. An auxiliary door for a boxcar having a side wall door opening provided with opposed upright jamb members, said door comprising a door frame having opposed jamb elements connected together in braced spaced apart relationship by bracing means whereby the jamb elements of the door are adapted to overlie the inside of the jamb members of the door opening in the side wall of the boxcar when the door is closed, a flexible door panel secured to and extending between the opposed jamb elements of the door on that side of the bracing means adjacent to the outside of the boxcar, a flexible sealing strip extending along and secured to each upright jamb element of the door and projecting outwardly therebeyond generally within the plane of the door and adapted to overlie the adjacent side wall of the boxcar, a flexible sealing strip extending along and secured to the bottom margin of the flexible door panel and adapted to overlie the floor of the boxcar along the door opening projecting inwardly of the car from said opening, said flexible bottom sealing strip extending laterally beyond the upright jamb elements of the door and connected with the sealing strips which extend along the upright jamb elements of the door.

5. An auxiliary door for a boxcar having a side wall door opening provided with opposed upright jamb members, said door comprising a door frame consisting of a pair of opposed jamb elements connected at the top of the door by a header and bracing elements extending between the jamb elements and connecting them together in spaced braced apart relationship whereby the jamb elements of the door frame are adapted to overlie the inside of the jamb members of the door opening in the side wall of the boxcar when the door is closed, a flexible door panel secured to and extending between the opposed jamb elements of the door on that side of the bracing means adjacent to the outside of the boxcar, a flexible sealing strip detachably secured to the bottom of the flexible door panel and adapted to overlie the floor of the boxcar extending inwardly thereof from the flexible door panel, a flexible sealing strip detachably secured to each upright jamb element of the door frame projecting therebeyond to overlie the side wall of the boxcar and bear thereagainst beyond the door, means connected with the door frame pivotally supporting the door for swingable movement upwardly and inwardly within the boxcar.

6. An auxiliary door for a boxcar having a side wall door opening provided with opposed upright jamb members, said door comprising a door frame consisting of a pair of opposed channel-shaped jamb elements connected at the top of the door by a channel-shaped header and bracing elements extending between the jamb elements and connecting them together in spaced braced apart relationship whereby the jamb elements of the door frame are adapted to overlie the inside of the jamb members of the door opening in the side wall of the boxcar, a flexible door panel secured to and extending between the opposed jamb elements of the door on that side of the bracing means adjacent to the outside of the boxcar, a flexible sealing strip detachably secured to the bottom of the flexible door panel and adapted to overlie the floor of the boxcar extending inwardly thereof from the flexible door panel, a flexible sealing strip detachably secured to each upright jamb element of the door frame projecting therebeyond to overlie the side wall of the boxcar and bear thereagainst beyond the door, means connected with the door frame pivotally supporting the door for swingable movement upwardly and inwardly within the boxcar, and means yieldingly tensioning the top of the door toward the side wall of the car provided with the door opening and in opposite directions away from the door opening parallel to the side of the boxcar to center the door with respect to said opening.

7. An auxiliary door for a boxcar having a side wall door opening provided with opposed upright jamb members, said door comprising a door frame consisting of a pair of opposed rigid channel-shaped jamb elements connected at the top of the door by a rigid channel-shaped header and rigid bracing elements extending between the jamb elements and connecting them together in rigid spaced braced apart relationship whereby the jamb elements of the door frame are adapted to overlie the inside of the jamb members of the door opening in the side wall of the boxcar, a flexible door panel secured to and extending between the opposed jamb elements of the door on that side of the bracing means adjacent to the outside of the boxcar, a flexible sealing strip detachably secured to the bottom of the flexible door panel and adapted to overlie the floor of the boxcar extending inwardly thereof from the flexible door panel, a flexible sealing strip detachably secured to each upright jamb element of the door frame projecting thereof to overlie the side wall of the boxcar and bear thereagainst beyond the door, means connected with the door frame supporting the door for swingable movement upwardly and inwardly within the boxcar, means yieldingly tensioning the top of the door toward the side wall of the car provided with the door opening and in opposite directions away from the door opening parallel to the side of the boxcar to center the door with respect to said opening, said flexible door panel provided with a port opening therethrough in proximity to the bottom margin of the panel, and a frangible closure panel extending over said port opening upon the inside of the flexible door panel.

8. An auxiliary door for a boxcar as defined in claim 5 characterized in that the means connected with the door frame and supporting the door for swingable movement comprises hoisting mechanism connected with the opposite jamb elements of the door frame and connected with the interior of the boxcar and operable to elevate the door within the interior of the boxcar upwardly toward the roof thereof, and characterized further in that a flexible sealing strip is secured to the bottom of the door panel and extends through cut-outs provided in the lower ends of the door jamb elements and is connected therebeyond with the lower ends of the sealing strips secured to said jamb elements.

9. An auxiliary door for a boxcar having a side wall door opening provided with opposed upright jamb members, said door comprising a frame having opposed jamb elements connected together in braced spaced-apart relationship by bracing means whereby the jamb elements of the door are adapted to overlie the inside of the upright jamb members of the door opening in the side wall of the boxcar when the door is closed, a flexible door panel secured to and extending between the opposed jamb elements of the door on that side of the bracing means adjacent to the outside of the boxcar whereby pressure by the contents of the boxcar against the door panel from the inside of the car toward the outside exerts a direct compressive force upon the jamb elements of the door frame toward each other and within the plane of the door, said door being shiftable from the open to the closed position, said door being characterized in that a flexible linear support is detachably connected and tensioned lengthwise between the jamb members of the door opening spaced above the top of the door and below the top of the door opening, and door hangers are provided connecting the top of the door with said linear support for swingable movement of the door thereabout inwardly of the boxcar.

10. An auxiliary door for a boxcar having a side wall door opening provided with opposed upright jamb members, said door comprising a frame having opposed jamb elements connected at their upper ends by a header element and connected together in braced spaced-apart relationship below said header by rigid bracing elements whereby said door may be disposed to close the lower portion of the door opening with the jamb elements of the door frame overlying the jamb members of the door opening, means operable to releasably secure the jamb elements of the door to the jamb members of the door opening inside of the boxcar, panel means secured to the jamb members of the door frame and extending therebetween, sealing means extending along each jamb element of the door and projecting therebeyond to overlie the adjacent side wall of the boxcar, sealing means extending along the bottom margin of the door panel and inwardly of the floor adjacent thereto, said sealing means adapted to seal the door against the side wall of the car on opposite sides of the door opening and to seal the same against the floor inwardly of the door panel means, said door being characterized in that a flexible supporting element extends detachably between and is connected at opposite ends to opposed door jamb members spaced above the header of the door, and door hangers detachably connect said linear supporting element in alignment with the header of the door.

11. An auxiliary door for a boxcar having a side wall door opening provided with opposed upright jamb members, said door comprising a frame having opposed jamb elements connected at their upper ends by a header element and connected together in braced spaced-apart relationship below said header by rigid bracing elements whereby said door may be disposed to close the lower portion of the door opening with the jamb elements of the door frame overlying the jamb members of the door opening, means operable to releasably secure the jamb elements of the door to the jamb members of the door opening inside of the boxcar, panel means secured to the jamb members of the door frame and extending therebetween, sealing means extending along each jamb element of the door and projecting therebeyond to overlie the adjacent side wall of the boxcar, sealing means extending along the bottom margin of the door panel and inwardly of the floor adjacent thereto, said sealing means adapted to seal the door against the side wall of the car on opposite sides of the door opening and to seal the same against the floor inwardly of the door panel means, said door being characterized in that spring means are secured to opposite sides of the top of the door and to the interior of the boxcar above the door opening and spaced therefrom toward the opposite ends of the boxcar from the opening exerting upward tension on the door and tending to center the same over the door opening lengthwise of the boxcar, and hoist mechanism is secured to the door jamb elements at points spaced below the top of the door and secured to the interior of the boxcar inwardly of and above the door opening, said hoist mechanism being operable to elevate the door interiorly of the boxcar and to a position spaced above the door opening.

12. An auxiliary door for a boxcar having a side wall door opening provided with opposed upright jamb members, said door comprising a door frame having opposed jamb elements connected together in braced spaced apart relationship by bracing means whereby the jamb elements of the door are adapted to overlie the inside of the jamb members of the door opening in the side wall of the boxcar when the door is closed, a flexible door panel secured to and extending between the opposed jamb elements of the door on that side of the bracing means adjacent to the outside of the boxcar, sealing means for providing a seal along the sides and bottom of said door including side sealing means connected to said door adapted to overlie adjacent side walls of the boxcar and including a bottom flexible sealing strip connected to said flexible door panel and adapted to overlie the floor of the boxcar along the door opening projecting inwardly of the car from said opening, said bottom flexible sealing strip adapted to move outwardly with said flexible door panel when said flexible door panel is forced outwardly by the contents of said boxcar to maintain the integrity of the bottom seal.

References Cited in the file of this patent

UNITED STATES PATENTS

| | | |
|---|---|---|
| 1,489,643 | Koskinen | Apr. 8, 1924 |
| 1,555,884 | Simpson | Oct. 6, 1925 |
| 2,316,688 | Haase | Apr. 13, 1943 |
| 2,689,608 | Suess | Sept. 21, 1954 |
| 2,738,559 | Edwards | Mar. 20, 1956 |
| 2,804,953 | Buehler | Sept. 3, 1957 |
| 2,822,044 | Leslie | Feb. 4, 1958 |
| 2,890,747 | Murphy | June 16, 1959 |